(12) United States Patent
Niu et al.

(10) Patent No.: US 8,114,957 B2
(45) Date of Patent: Feb. 14, 2012

(54) PROCESS FOR PREPARING POLY(TRIMETHYLENE ETHER) GLYCOL AND COPOLYMERS THEREOF

(75) Inventors: Yanhui Niu, Newark, DE (US); Zuohong Yin, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 424 days.

(21) Appl. No.: 12/367,580

(22) Filed: Feb. 9, 2009

(65) Prior Publication Data

US 2010/0204436 A1     Aug. 12, 2010

(51) Int. Cl.
*C08G 65/34*     (2006.01)
(52) U.S. Cl. ........ 528/425; 568/619; 568/621; 568/679; 568/868; 502/167
(58) Field of Classification Search ................... 528/425; 568/619, 621, 679, 868
See application file for complete search history.

(56) References Cited

U.S. PATENT DOCUMENTS

| | | |
|---|---|---|
| 2005/0272911 A1 | 12/2005 | Okoshi et al. |
| 2005/0283028 A1 | 12/2005 | Sunkara et al. |
| 2007/0173669 A1 * | 7/2007 | Sunkara et al. ............... 568/619 |
| 2007/0203371 A1 | 8/2007 | Sunkara et al. |
| 2008/0177024 A1 | 7/2008 | Ng |

OTHER PUBLICATIONS

Currie, L.A., "Source Apportionment of Atmospheric Particles", Characterization of Environmental Particles, J. Buffle and H.P. van Leeuwen, Eds., 1 of vol. I of the IUPAC Environmental Analytical Chemistry Series (Lewis Publishers, Inc.), 1992, pp. 3-74.
Hsieh, Y., "Division S-3—Soil Microbiology and Biochemistry, Pool Size and Mean Age of Stable Soil Organic Carbon in Cropland", Soil Sci. Soc. Am. J., 56, 1992, pp. 460-464.
Weber, D. et al., "C-Pattern of Natural Glycerol: Origin and Practical Importance", J. Agric. Food Chem., 45, 1997, pp. 2042-2046.

* cited by examiner

*Primary Examiner* — Randy Gulakowski
*Assistant Examiner* — Rachel Kahn

(57) ABSTRACT

Processes for preparing relatively high molecular weight poly(trimethylene ether)glycol employing a cocatalyst system are provided.

5 Claims, No Drawings

PROCESS FOR PREPARING POLY(TRIMETHYLENE ETHER) GLYCOL AND COPOLYMERS THEREOF

FIELD OF INVENTION

The present invention relates to a process for preparing relatively poly(trimethylene ether)glycols employing a cocatalyst system.

BACKGROUND

Poly(trimethylene ether)glycol and its uses have been described in the art. Known methods for preparation of a poly(trimethylene ether)glycol involve acid catalyzed polycondensation of 1,3-propanediol. Sulfuric acid is commonly used as a catalyst.

Catalyst systems including an acid and base have been used to produce polyether polyol. (US Patent Publications Nos. 2005/0272911A1 and 2007/0203371A1.)

Processes for manufacturing poly(trimethylene ether)glycol are known. However, it is can be difficult to produce polyol with molecular weight greater than 2000. Extended polymerization times, higher amount of acid catalyst, and higher reaction temperatures can be used to achieve relatively high molecular weight poly(trimethylene ether)glycol, but these process conditions incur higher energy costs, longer cycle times and higher final product color. The presence of color is undesirable for some applications.

The present invention provides processes for making relatively high molecular weight polymeric poly(trimethylene ether)glycol. The processes use a polycondensation co-catalyst system.

SUMMARY OF THE INVENTION

One aspect of the present invention is a process for the manufacture of a poly(trimethylene ether)glycol, comprising the steps of:

(a) polycondensing a reactant comprising a diol selected from the group consisting of 1,3-propanediol, 1,3-propanediol dimer, 1,3-propanediol trimer and mixtures thereof, in the presence of a polycondensation catalyst system comprising an acid catalyst and a base catalyst, to form a poly(trimethylene ether)glycol and an acid ester of the acid catalyst;

(b) adding water to the poly(trimethylene ether)glycol and hydrolyzing the acid ester formed during the polycondensation to form a hydrolyzed aqueous-organic mixture containing poly(trimethylene ether)glycol and residual acid catalyst;

(c) forming an aqueous phase and an organic phase from the hydrolyzed aqueous-organic mixture, wherein the organic phase contains poly(trimethylene ether)glycol and residual acid polycondensation catalyst, and wherein the organic phase optionally contains residual water, (d) separating the aqueous phase and the organic phase;

(e) optionally adding base to the separated organic phase to neutralize residual acid polycondensation catalyst by forming salts of the residual acid polycondensation catalyst;

(f) removing residual water from the organic phase; and (g) if no base has been added to the separated organic phase, optionally separating the organic phase into (i) a liquid phase comprising poly(trimethylene ether)glycol, and (ii) a solid phase comprising salts of the residual acid polycondensation catalyst and unreacted base, and if base has been added to the separated organic phase, separating the organic phase into (i) a liquid phase comprising poly(trimethylene ether) glycol, and (ii) a solid phase comprising salts of the residual acid polycondensation catalyst and unreacted base.

DETAILED DESCRIPTION

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Unless stated otherwise, all percentages, parts, ratios, etc., are by weight.

The materials, methods, and examples herein are illustrative only and, except as specifically stated, are not intended to be limiting. Although methods and materials similar or equivalent to those described herein can be used in the practice or testing of the present invention, suitable methods and materials are described herein.

Starting Materials

The starting material for the process is reactant comprising at least one of 1,3-propanediol, 1,3-propanediol dimer and 1,3-propanediol trimer, or mixtures thereof. The 1,3-propanediol component of the reactant employed in the process of the present invention may be obtained by any of the various chemical routes or by biochemical transformation routes.

A preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacillus*.

The biologically-derived 1,3-propanediol, such as produced by the processes described above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The poly(trimethylene ether)glycol and personal care compositions of the present invention utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again. Thus, the compositions present invention can be characterized as more natural and having less environmental impact than similar compositions comprising petroleum based glycols.

The biologically-derived 1,3-propanediol, and poly(trimethylene ether)glycols, may be distinguished from similar compounds produced from a petrochemical source or from fossil fuel carbon by dual carbon-isotopic finger printing. This method usefully distinguishes chemically-identical materials, and apportions carbon in the copolymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*. J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship $$t=(-5730/0.693)\ln(A/A_0)$$

where t=age, 5730 years is the half-life of radiocarbon, and A and $A_0$ are the specific $^{14}C$ activity of the sample and of the modern standard, respectively (Hsieh, Y., Soil Sci. Soc. Am J., 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-industrial Revolution wood. For the current living biosphere (plant material), $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta$ $^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphoenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., J. Agric. Food Chem., 45, 2042 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000\%$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as the reactant or as a component of the reactant will have a purity of greater than about 99%, and more preferably greater than about 99.9%, by weight as determined by gas chromatographic analysis.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having CIELAB L*a*b* "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The starting material for making poly(trimethylene ether) glycol will depend on the desired poly(trimethylene ether) glycol, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably 99% by weight or more 1,3-propanediol, based on the weight of the 1,3-propanediol reactant.

The starting material for the present invention may also contain small amounts, preferably no more than about 30%, and more preferably no more than about 10%, by weight, of the starting material, of comonomer diols in addition to the reactant 1,3-propanediol or its dimers and trimers without detracting from the efficacy of the process. Examples of preferred comonomer diols include ethylene glycol, 2-methyl-1,3-propanediol, 2,2-dimethyl-1,3 propanediol, and $C_6$-$C_{12}$ diols such as 2,2-diethyl-1,3-propanediol, 2-ethyl-2-hydroxymethyl-1,3-propanediol, 1,6-hexanediol, 1,8-octanediol, 1,10-decanediol, 1,12-dodecanediol, 1,4-cyclohexanediol and 1,4-cyclohexanedimethanol. A more preferred comonomer diol is ethylene glycol. The poly(trimethylene ether)glycols of this invention can also be prepared using from about 10 to about 0.1 mole percent of an aliphatic or aromatic diacid or diester, preferably terephthalic acid or dimethyl terephthalate, and most preferably terephthalic acid.

Additives

Stabilizers (e.g., UV stabilizers, thermal stabilizers, antioxidants, corrosion inhibitors, etc.), viscosity boosters, antimicrobial additives and coloring materials (e.g., dyes, pigments, etc.) may be added to the polymerization mixture or final product if necessary.

Catalysts

The present process uses a polycondensation co-catalyst system for the production of poly(trimethylene ether)glycol. The polycondensation co-catalyst system comprises an acid and a base. Any acid catalyst suitable for acid catalyzed polycondensation of 1,3-propanediol may be used in present process. The catalysts are preferably selected from the group consisting of Lewis acids, Bronsted acids, super acids and mixtures thereof, and they include both homogeneous and heterogeneous catalysts. More preferably, the acid catalysts are selected from the group consisting of inorganic acids, organic sulfonic acids, heteropolyacids and metal salts. Still more preferably, the acid catalyst is a homogeneous catalyst, preferably selected from the group consisting of sulfuric acid, hydriodic acid, fluorosulfonic acid, phosphorous acid, p-toluenesulfonic acid, benzenesulfonic acid, methanesulfonic acid, phosphotungstic acid, trifluoromethanesulfonic acid, phosphomolybdic acid, 1,1,2,2-tetrafluoro-ethanesulfonic acid, 1,1,1,2,3,3-hexafluoropropanesulfonic acid, bismuth triflate, yttrium triflate, ytterbium triflate, neodymium triflate, lanthanum triflate, scandium triflate and zirconium triflate. The catalyst can also be a heterogeneous catalyst, preferably selected from the group consisting of zeolites, fluorinated alumina, acid-treated alumina, heteropolyacids and heteropolyacids supported on zirconia, titania alumina and/or silica. An especially preferred acid component of the co-catalyst is sulfuric acid.

The amount of base in the catalyst system is desirablysuch that it is insufficient to neutralize all of the acid present in the catalyst. While any base can be used, particularly useful ones include sodium carbonate ($Na_2CO_3$), Schiff bases, and azo compounds. A Schiff base (or azomethine), is a functional group that contains a carbon-nitrogen double bond with the nitrogen atom connected to an aryl or alkyl group—but not hydrogen. Schiff bases are of the general formula $R_1R_2C{=}N{-}R_3$, where $R_1$, $R_2$, and $R_3$ are aryl or alkyl groups that make the Schiff base a stable imine. Preferably, $R_1$, $R_2$, and $R_3$ are $C_1$-$C_{18}$, substituted or unsubstituted alkyl groups. Azo compounds are of general formula R—N=N—R', where R and R' are $C_1$-$C_{18}$ alkyl or aryl. Schiff bases that find particular use in the processes disclosed herein include N-benzylidene aniline (NBA), N-benzylidenebenzylamine, N,N'-(1,2-ethanediylidene)biscyclohexylamine, NN'-bis (salicylidene)ehtylenediamine, etc. Azo compounds that find particular use in the processes disclosed herein include azobenzene, 4-phenylazophenol, etc.

Preferably, the polycondensation acid catalyst is used in an amount of from about 0.1 wt % to about 3 wt %, more preferably from about 0.5 wt % to about 1.5 wt %, based on the weight of reactant. The base catalyst is used in an amount from 0.1 to 95.0 mol percent, based on the total weight of the acid catalyst.

Optional additives may also be present during the polycondensation, for example, an inorganic compound such as an alkali metal carbonate, and an onium compound.

Preferred inorganic compounds are alkali metal carbonates, more preferably selected from potassium carbonate and/or sodium carbonate, and still more preferably sodium carbonate.

By onium compound is meant a salt which has onium ion as the counter cation. Generally, the onium salt has a cation (with its counterion) derived by addition of a hydron to a mononuclear parent hydride of the nitrogen, chalcogen and halogen family, e.g. $H_4N^+$ ammonium ion. It also includes $Cl_2F^+$ dichlorofluoronium, $(CH_3)_2S^+H$ dimethylsulfonium (a secondary sulfonium ion), $ClCH_3)_3P^+$ chlorotrimethylphosphonium, $(CH_3CH_2)_4N^+$ tetraethylammonium (a quaternary ammonium ion). Preferred are quaternary ammonium compounds, phosphonium compounds, arsonium compounds, stibonium compounds, oxonium ions, sulfonium compounds and halonium ions. Preferred compounds also include derivatives formed by substitution of the parent ions by univalent groups, e.g. $(CH_3)_2S^+H$ dimethylsulfonium, and $(CH_3CH_2)_4 N^+$ tetraethylammonium. Onium compounds also include derivatives formed by substitution of the parent ions by groups having two or three free valencies on the same atom. Such derivatives are, whenever possible, designated by a specific class name, e.g. $RC{\equiv}O^+$ hydrocarbylidyne oxonium ions $R_2C{=}NH_2^+$ iminium ion, $RC{\equiv}NH^+$ nitrilium ions. Other examples include carbenium ion and carbonium ion. Preferred onium compounds also include $Bu_4N^+HSO_4^-$, $(Me_4N)_2{}^+SO_4^{2-}$, $Py^+Cl^-$, $Py^+OH^-$, $Py^+(CH^2)^{15}CH^3Cl^-$, $Bu_4P^+Cl^-$ and $Ph_4^+PCl^-$.

Step (a)—Polymerization Process

The polymerization process can be batch, semi-continuous, continuous, etc. In this embodiment, the polytrimethylene-ether glycol is prepared by a process comprising the steps of: (a) providing (1) reactant, and (2) polycondensation co-catalyst system; and (b) polycondensing the reactants to form a poly(trimethylene ether)glycol. The reaction is preferably conducted at an elevated temperature of at least about 150° C., more preferably at least about 160° C., and most preferably up to about 170° C. The reaction is preferably conducted either at atmospheric pressure in the presence of inert gas or at reduced pressure (i.e., less than 760 mm Hg), preferably less than about 500 mm Hg in an inert atmosphere, and extremely low pressures can be used (e.g., as low as about 1 mm Hg or $133.3 \times 10^{-6}$ MPa). The reaction is carried out over a time period of 12 hours or more, depending in part on the desired final product molecular weight.

A preferred continuous process for preparation of the poly (trimethylene ether)glycols of the present invention comprises: (a) continuously providing (i) reactant, and (ii) polycondensation co-catalyst system; and (b) continuously polycondensing the reactant to form poly(trimethylene ether) glycol.

Step (b)—Hydrolysis

Regardless of whether the process is a continuous or batch process, or otherwise, a substantial amount of acid ester is formed from reaction of the catalyst with the hydroxyl compounds, particularly when a homogeneous acid catalyst (and most particularly sulfuric acid) is used. In the case of sulfuric acid, a substantial portion of the acid is converted to the ester, alkyl hydrogen sulfate. It is important to remove these acid esters because, for example, they can act as emulsifying agents during the water washing used to remove catalyst and therefore cause the washing process to be difficult and time consuming. Moreover, the hydrolysis step is also important in order to obtain polymer with the high dihydroxy functionality required to use the polymer as a reactive intermediate. Furthermore, the hydrolysis step is also important in order to obtain polymer at conversion (yield).

Thus, the next step comprises hydrolyzing the acid esters formed during the polycondensing that are in the aqueous-organic mixture.

The hydrolysis step is preferably carried out by adding water to the polymer. The amount of water added can vary and is preferably from about 10 to about 200 wt %, more preferably from about 50 to about 100 wt %, based on the weight of the poly(trimethylene ether)glycol. Hydrolysis is preferably carried out by heating the aqueous-organic mixture to a temperature in the range from about 50 to about 110° C., preferably from about 90 to about 110° C. (and more preferably from about 90 to about 100° C. when carried out at atmospheric pressure), for a period of sufficient time to hydrolyze the acid esters. The hydrolysis step is preferably conducted at atmospheric or slightly above atmospheric pressure, preferably at about 700 mmHg to about 1600 mmHg. Higher pressures can be used, but are not preferred. The hydrolysis step is carried out preferably under inert gas atmosphere.

Steps (c) and (d)—Phase Formation/Separation

The next steps involve forming and separating the water phase and the organic phase.

Phase formation and separation is preferably promoted by either adding an inorganic compound such as a base and/or salt, or by adding an organic solvent to the reaction mixture.

There are several processes for preparing poly(trimethylene ether)glycol by acid polycondensation wherein the phase separation after hydrolysis is promoted by addition of organic solvent miscible with poly(trimethylene ether)glycol, or is miscible with water. Generally, the solvents used in these processes may be used conjunction with water-soluble inorganic compounds to promote phase separation. Preferred is the use of the water-soluble inorganic compounds, which are added to the aqueous poly(trimethylene ether)glycol mixture after hydrolysis.

Preferred water-soluble, inorganic compounds are inorganic salts and/or inorganic bases. Preferred salts are those comprising a cation selected from the group consisting of ammonium ion, Group IA metal cations, Group IIA metal cations and Group IIIA metal cations, and an anion selected from the group consisting of fluoride, chloride, bromide, iodide, carbonate, bicarbonate, sulfate, bisulfate, phosphate, hydrogen phosphate, and dihydrogen phosphate (preferably chloride, carbonate and bicarbonate). Group IA cations are lithium, sodium, potassium, rubidium, cesium and francium cations (preferably lithium, sodium and potassium); Group IIA cations are beryllium, magnesium, calcium, strontium, barium and radium (preferably magnesium and calcium); and Group IIIA cations are aluminum, gallium, indium and thallium cations. More preferred salts for the purposes of the invention are alkali metal, alkaline earth metal and ammonium chlorides such as ammonium chloride, lithium chloride, sodium chloride, potassium chloride, magnesium chloride, calcium chloride; and alkali metal and alkaline earth metal carbonates and bicarbonates such as sodium carbonate and sodium bicarbonate. The most preferred salts are sodium chloride; and alkali metal carbonates such as sodium and potassium carbonate, and particularly sodium carbonate.

Typical inorganic bases for use in the invention are ammonium hydroxide and water-soluble hydroxides derived from any of the above-mentioned Group IA, IIA and IIIA metal cations. The most preferred water-soluble inorganic bases are sodium hydroxide and potassium hydroxide.

The amount of water-soluble, inorganic compound used may vary, but is preferably the amount effective in promoting the rapid separation of the water and inorganic phases. The preferred amount for this purpose is from about 1 to about 20 wt %, more preferred amount from about 1 to about 10 wt %, and still more preferably from about 2 to about 8 wt %, based on the weight of the water added to the poly(trimethylene ether)glycol in the hydrolysis step.

Preferably the time required for phase separation is less than about one hour. More preferably this time period is from less than about 1 minute to about one hour, and most preferably about 30 minutes or less.

Separation is preferably carried out by allowing the water phase and the organic phase to separate and settle so that the water phase can be removed. The reaction mixture is allowed to stand, preferably without agitation until settling and phase separation has occurred.

Once phase separation has occurred, the water phase and the organic phase can be split, preferably by decantation or draining. It is advantageous to retain the organic phase in the reactor for subsequent processing. Consequently, when the organic phase is on bottom it is preferably to decant off the aqueous phase and when the organic phase is on top, it is preferred to drain off the aqueous phase. The organic phase can contain residual water, due to water added during the process, and as a by product of the condensation reaction. Also, the organic phase may have some hydrophilicity, which can lead to the presence of water.

A preferred phase separation method when high molecular weight polymer is obtained is gravity separation of the phases.

Step (e)—Neutralization

Following the hydrolysis and phase separation steps, a base, preferably a substantially water-insoluble base, may be added to neutralize any remaining acid. During this step residual acid polycondensation catalyst is converted into its corresponding salts. However, the neutralization step can be optional.

Preferably, the base is selected from the group consisting of alkaline earth metal hydroxides and alkaline earth metal oxides. More preferably, the base is selected from the group consisting of calcium hydroxide, calcium oxide, magnesium hydroxide, magnesium oxide, barium oxide and barium hydroxide. Mixtures may be used. A particularly preferred base is calcium hydroxide. The base may be added as a dry solid, or preferably as an aqueous slurry. The amount of insoluble base utilized in the neutralization step is preferably at least enough to neutralize all of the acid polycondensation catalyst. More preferably a stoichiometric excess of from about 0.1 wt % to about 10 wt % is utilized. The neutralization is preferably carried out at 50 to 90° C. for a period of from 0.1 to 3 hours under nitrogen atmosphere.

Step (f)—Water/Solvent Removal

Next, the organic solvent, if it was used in the process, and the residual water is preferably removed from the organic phase by vacuum stripping (e.g., distillation at low pressure), generally with heating, which will also remove organic solvent if present and, if desired, unreacted monomeric materials. Other techniques can be used, such as distillation at about atmospheric pressure.

Step (g)—Further Purification

When base is added in step (e) such that residual acid catalyst salts are formed, and optionally otherwise, the organic phase is separated into (i) a liquid phase comprising the poly(trimethylene ether)glycol, and (ii) a solid phase comprising the salts of the residual acid polycondensation catalyst and unreacted base. Typically, this occurs by filtration, or centrifugation, to remove the base and the acid/base reaction products. Centrifugation and filtration methods are generally well known in the art. For example, filtration under the earth's gravity, centrifugal filtration, or pressure filtration can be used. Filter presses, candle filters, pressure leaf filters or conventional filter papers are also be used for the filtration, which can be carried out batch wise or continuously. Filtration in the presence of a filter-aid is preferred at a temperature range from 50 to 100° C. at a pressure range from 0.1 MPa to 0.5 MPa.

Even if base is not added in step (e), purification techniques like centrifugation and filtration may still be desirable for refining the final product.

Resulting poly(trimethylene ether)glycol

The resulting poly(trimethylene ether)glycols generally have a number average molecular weight higher than that achieved when conventional catalysts are used (e.g., sulfuric acid alone). The co-catalyst system allows the formation of poly(trimethylene ether)glycols with molecular weights from about 1500 to about 8000, preferably from about 2000 to about 6500. The product molecular weight depends in part on the amount of base used The invention is illustrated in the following examples. All parts, percentages, etc., referred to in the examples are by weight unless otherwise indicated. The number-average molecular weights of polytrimethylene ether glycol in the following examples was determined on crude polymers by analyzing end-groups using NMR spectroscopic methods known in the art. Although purification steps (b) are carried out to (e) to obtain purified polymer, crude and purified polymer molecular weight can be correlated by methods known in the art.

All chemicals, materials and reagents were used as received from Sigma-Aldrich Co., Milwaukee, Wis., unless otherwise specified.

Bio-PDO™ was obtained from DuPont/Tate & Lyle, Loudon, Tenn.

EXAMPLES

Example 1

1,3-propanediol (Bio-PDO™, 500 g) was charged into a 1 L glass flask and then heated to 165+/−1° C. under nitrogen with overhead stirring. Then N-benzylidene aniline (NBA, 0.66 g) was injected to the reaction flask and continued to heat. 8.26 g of sulfuric acid was injected to the reaction flask when reaction temperature reached 166+/−1° C. and continued to heat at 166+/−1° C. for 24 hrs to produce poly(trimethylene ether)glycol. During the reaction, by-product water was removed with a condenser.

The Mw of the resulting polymeric product is 6032, as measured with NMR (Table 1).

Example 2

1,3-propanediol (Bio-PDO™, 500 g) was charged into a 1 L glass flask and then heated to 165+/−1° C. under nitrogen with overhead stirring. Then $Na_2CO_3$ (0.66 g) was injected to the reaction flask and continued to heat. 8.26 g of sulfuric acid was injected to the reaction flask when reaction temperature reached 166+/−1° C. and continued to heat at 166+/−1° C. for 24 hrs to produce poly(trimethylene ether)glycol. During the reaction, by-product water was removed with a condenser.

The Mw of the resulting polymeric product is 2658 as measured with NMR (Table 1).

Example 3

1,3-propanediol (Bio-PDO™, 500 g) was charged into a 1 L glass flask and then heated to 165+/−1° C. under nitrogen with overhead stirring. Then azobenzene (0.66 g) was injected to the reaction flask and continue to heat. 8.26 g of sulfuric acid was injected to the reaction flask when reaction temperature reached 166+/−1° C. and continue to heat at 166+/−1° C. for 24 hrs to produce poly(trimethylene ether)glycol. During the reaction, by-product water was removed with a condenser.

The Mw of the resulting polymeric product is 6094.5 as measured with NMR (Table 1).

Example 4

1,3-propanediol (Bio-PDO™, 500 g) was charged into a 1 L glass flask and then heated to 165+/−1° C. under nitrogen with overhead stirring. Then $Na_2CO_3$ (0.66 g) was injected to the reaction flask and continued to heat. 8.26 g of sulfuric acid was injected to the reaction flask when reaction temperature reached 166+/−1° C. and continued to heat at 166+/−1° C. for 24 hrs to produce poly(trimethylene ether)glycol. During the reaction, by-product water was removed with a condenser.

The Mw of the resulting polymeric product is 2100 as measured with NMR (Table 1).

TABLE 1

| Co-Catalyst | Ex. No. | Time (hrs) | Mw |
|---|---|---|---|
| $Na_2CO_3$-1 | 2 | 24 | 2658 |
| $Na_2CO_3$-2 | 4 | 24 | 2100 |
| N-benzylidene aniline | 1 | 24 | 6032 |
| Azobenzene | 3 | 24 | 6094.5 |

Example 5

1,3-propanediol (Bio-PDO™, 500 g) was charged into a 1 L glass flask and then heated to 165+/−1° C. under nitrogen with overhead stirring. Then N-benzylidene aniline (0.66 g) was injected to the reaction flask and continued to heat. 8.26 g of sulfuric acid was injected to the reaction flask when reaction temperature reached 166+/−1° C. and continued to heat at 166+/−1° C. for 17 hrs to produce poly(trimethylene ether)glycol. During the reaction, by-product water was removed with a condenser.

The Mw of the resulting polymeric product is 1958.5 as measured with NMR.

Example 6

1,3-propanediol (Bio-PDO™, 500 g) was charged into a 1 L glass flask and then heated to 165+/−1° C. under nitrogen with overhead stirring. Then $Na_2CO_3$ (0.66 g) was injected to the reaction flask and continued to heat. 8.26 g of sulfuric acid was injected to the reaction flask when reaction temperature reached 166+/−1° C. and continued to heat at 166+/−1° C. for 17 hrs to produce poly(trimethylene ether)glycol. During the reaction, by-product water was removed with a condenser.

The Mw of the resulting polymeric product is 1772.6 as measured with NMR.

Example 7

1,3-propanediol (Bio-PDO™, 500 g) was charged into a 1 L glass flask and then heated to 165+/−1° C. under nitrogen with overhead stirring. Then Na$_2$CO$_3$ (0.66 g) was injected to the reaction flask and continued to heat. 8.26 g of sulfuric acid was injected to the reaction flask when reaction temperature reached 166+/−1° C. and continued to heat at 166+/−1° C. for 17 hrs to produce poly(trimethylene ether)glycol. During the reaction, by-product water was removed with a condenser.

The Mw of the resulting polymeric product is 2111.8 as measured with NMR.

Example 8

1,3-propanediol (Bio-PDO™, 500 g) was charged into a 1 L glass flask and then heated to 165+/−1° C. under nitrogen with overhead stirring. Then N-benzylidene aniline (0.66 g) was injected to the reaction flask and continued to heat. 8.26 g of sulfuric acid was injected to the reaction flask when reaction temperature reached 166+/−1° C. and continued to heat at 166+/−1° C. for 24 hrs to produce poly(trimethylene ether)glycol. During the reaction, by-product water was removed with a condenser.

The Mw of the resulting polymeric product is 5914.5 as measured with NMR (Table 2).

Example 9

1,3-propanediol (Bio-PDO™, 500 g) was charged into a 1 L glass flask and then heated to 165+/−1° C. under nitrogen with overhead stirring. Then N-benzylidene aniline (0.33 g) was injected to the reaction flask and continued to heat. 8.26 g of sulfuric acid was injected to the reaction flask when reaction temperature reached 166+/−1° C. and continued to heat at 166+/−1° C. for 24 hrs to produce poly(trimethylene ether)glycol. During the reaction, by-product water was removed with a condenser.

The Mw of the resulting polymeric product is 4855.7 as measured with NMR (Table 2).

Example 10

1,3-propanediol (Bio-PDO™, 500 g) was charged into a 1 L glass flask and then heated to 165+/−1° C. under nitrogen with overhead stirring. Then N-benzylidene aniline (0.99 g) was injected to the reaction flask and continued to heat. 8.26 g of sulfuric acid was injected to the reaction flask when reaction temperature reached 166+/−1° C. and continued to heat at 166+/−1° C. for 24 hrs to produce poly(trimethylene ether)glycol. During the reaction, by-product water was removed with a condenser.

The Mw of the resulting polymeric product is 7671.1 as measured with NMR (Table 2).

TABLE 2

| Co-Catalyst | Ex. No. | Content (%) | Time (hrs) | Mw |
| --- | --- | --- | --- | --- |
| N-benzylidene aniline | 9 | 0.05 | 24 | 4855.7 |
| N-benzylidene aniline | 8 | 0.1 | 24 | 5914.5 |
| N-benzylidene aniline | 10 | 0.15 | 24 | 7671.1 |

Example 11

1,3-propanediol (Bio-PDO™, 500 g) was charged into a 1 L glass flask and then heated to 165+/−1° C. under nitrogen with overhead stirring. Then N-benzylidene aniline (0.66 g) was injected to the reaction flask and continued to heat. 8.26 g of sulfuric acid was injected to the reaction flask when reaction temperature reached 166+/−1° C. and continued to heat at 166+/−1° C. to produce poly(trimethylene ether)glycol. During the reaction, samples of polymer were taken out to measure the Mw with NMR at different reaction periods according to the table. The by-product water was removed with a condenser.

The Mw of the resulting polymeric product is showed in Table 3.

Example 12

1,3-propanediol (Bio-PDO™, 500 g) was charged into a 1 L glass flask and then heated to 165+/−1° C. under nitrogen with overhead stirring. Then N-benzylidene aniline (0.66 g) was injected to the reaction flask and continued to heat. 8.26 g of sulfuric acid was injected to the reaction flask when reaction temperature reached 166+/−1° C. and continued to heat at 166+/−1° C. to produce poly(trimethylene ether)glycol. During the reaction, samples of polymer were taken out to measure the Mw with NMR at different reaction periods according to the table. The by-product water was removed with a condenser.

The Mw of the resulting polymeric product is showed in Table 3.

TABLE 3

| | Example 11 | | Example 12 | |
| --- | --- | --- | --- | --- |
| Order | Time | Mw | Time | Mw |
| 1 | 4 hr | 252.91 | 17 hr | 2272.07 |
| 2 | 8 hr | 601.16 | 19 hr | 2951.61 |
| 3 | 24 hr | 6221.33 | 21 hr | 3818.68 |
| 4 | 26 hr | 7210.41 | 22 hr | 4720.88 |
| 5 | 28 hr | 9831.64 | 23.5 hr | 5857.44 |
| 6 | 29 hr | 9674.12 | 24 hr | 6680.05 |

Example 13

1,3-propanediol (Bio-PDO™, 500 g) was charged into a 1 L glass flask and then heated to 165+/−1° C. under nitrogen with overhead stirring. Then Na$_2$CO$_3$ (0.66 g) was injected to the reaction flask and continued to heat. 8.26 g of sulfuric acid was injected to the reaction flask when reaction temperature reached 166+/−1° C. and continued to heat at 166+/−1° C. to produce poly(trimethylene ether)glycol. During the reaction, samples of polymer were taken out to measure the Mw with NMR at different reaction periods according to the table. The by-product water was removed with a condenser.

The Mw of the resulting polymeric product is showed in Table 4 and FIG. 1.

Example 14

1,3-propanediol (Bio-PDO™, 500 g) was charged into a 1 L glass flask and then heated to 165+/−1° C. under nitrogen with overhead stirring. Then Na₂CO₃ (0.66 g) was injected to the reaction flask and continued to heat. 8.26 g of sulfuric acid was injected to the reaction flask when reaction temperature reached 166+/−1° C. and continued to heat at 166+/−1° C. to produce poly(trimethylene ether)glycol. During the reaction, samples of polymer were taken out to measure the Mw with NMR at different reaction periods according to the table. The by-product water was removed with a condenser.

The Mw of the resulting polymeric product is showed in Table 4.

TABLE 4

|  | Example 13 | | Example 14 | |
|---|---|---|---|---|
| Order | Time | Mw | Time | Mw |
| 1 | 4 hr | 223.91 | 17 hr | 1831.57 |
| 2 | 8 hr | 558.19 | 19 hr | 2078.19 |
| 3 | 24 hr | 2438.99 | 22 hr | 2494.68 |
| 4 | 26 hr | 2644.9 | | |
| 5 | 29 hr | 3055.69 | | |
| 6 | 32 hr | 3503.76 | | |
| 7 | 48 hr | 5787.57 | | |

Example 15

1,3-propanediol (Bio-PDO™, 3000 g) was charged into a 1 L glass flask and then heated to 165+/−1° C. under nitrogen with overhead stirring. Then N-benzylidene aniline (3.96 g) was injected to the reaction flask and continued to heat. 28.38 g of sulfuric acid was injected to the reaction flask when reaction temperature reached 166+/−1° C. and continued to heat at 166+/−1° C. for 24 hrs to produce poly(trimethylene ether)glycol. During the reaction, by-product water was removed with a condenser.

The Mw of the resulting polymeric product is 6425.8 as measured with NMR.

What is claimed is:

1. A process for the manufacture of a poly(trimethylene ether) glycol, comprising the steps of:
   (a) polycondensing a reactant comprising a diol selected from the group consisting of 1,3-propanediol, 1,3-propanediol dimer, 1,3-propanediol trimer and mixtures thereof, in the presence of a polycondensation catalyst system comprising at least one acid catalyst and at least one base catalyst, wherein the base catalyst is a N-benzylidene aniline or an azobenzene, to form a poly(trimethylene ether) glycol and an acid ester of the acid catalyst;
   (b) adding water to the poly(trimethylene ether) glycol and hydrolyzing the acid ester formed during the polycondensation to form a hydrolyzed aqueous-organic mixture containing poly(trimethylene ether) glycol and residual acid catalyst;
   (c) forming an aqueous phase and an organic phase from the hydrolyzed aqueous-organic mixture, wherein the organic phase contains poly(trimethylene ether) glycol and residual acid polycondensation catalyst, and wherein the organic phase optionally contains residual water,
   (d) separating the aqueous phase and the organic phase;
   (e) optionally adding base to the separated organic phase to neutralize residual acid polycondensation catalyst by forming salts of the residual acid polycondensation catalyst;
   (f) removing residual water from the organic phase; and
   (g) if no base has been added to the separated organic phase, optionally separating the organic phase into (i) a liquid phase comprising poly(trimethylene ether) glycol, and (ii) a solid phase comprising salts of the residual acid polycondensation catalyst and unreacted base, and if base has been added to the separated organic phase, separating the organic phase into (i) a liquid phase comprising poly(trimethylene ether) glycol, and (ii) a solid phase comprising salts of the residual acid polycondensation catalyst and unreacted base.

2. The process of claim 1, wherein said at least one acid is sulfuric acid.

3. The process of claim 1, wherein said polycondensation catalyst system is present at 0.1 weight percent to 3 weight percent, based on the total weight of the reactant.

4. The process of claim 3, wherein said acid and base of said polycondensation catalyst system are present in an amount of 0.1 to 3 weight percent, based on the total weight of the reactant, and said base is present in an amount of 0.1 to 95 mol percent, based on the total amount of acid.

5. The process of claim 1, wherein the hydrolysis is carried out by heating the aqueous-organic mixture to a temperature in the range from about 50 to about 110° C.

* * * * *